United States Patent
Harris

(10) Patent No.: US 8,686,055 B2
(45) Date of Patent: Apr. 1, 2014

(54) SHELL FUNCTIONALIZED ION EXCHANGE RESINS

(75) Inventor: William Harris, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/590,276

(22) Filed: Aug. 21, 2012

(65) Prior Publication Data

US 2013/0053460 A1 Feb. 28, 2013

Related U.S. Application Data

(60) Provisional application No. 61/529,469, filed on Aug. 31, 2011.

(51) Int. Cl.
*B01J 39/20* (2006.01)
(52) U.S. Cl.
USPC .................. 521/38; 521/25; 526/87; 526/336
(58) Field of Classification Search
USPC .................................. 521/38, 25; 526/87, 336
See application file for complete search history.

(56) References Cited

U.S. PATENT DOCUMENTS

| 4,975,201 A | 12/1990 | Ma |
| RE34,112 E | 10/1992 | Ma |
| 5,244,926 A | 9/1993 | Harris et al. |
| 5,278,193 A | 1/1994 | Eiffler et al. |
| 2001/0009928 A1* | 7/2001 | Podszun et al. .................. 521/25 |
| 2007/0141500 A1* | 6/2007 | Sugimoto et al. ........... 430/110.3 |
| 2009/0004594 A1* | 1/2009 | Kurokawa ................ 430/137.17 |

FOREIGN PATENT DOCUMENTS

| EP | 0101943 | 3/1984 |
| EP | 101943 A2 * | 3/1984 |
| WO | 93/25592 A1 | 12/1993 |

* cited by examiner

*Primary Examiner* — Peter D. Mulcahy
*Assistant Examiner* — Henry Hu
(74) *Attorney, Agent, or Firm* — Carl P. Hemenway

(57) ABSTRACT

The present invention relates to a method for the production of improved shell functionalized ion exchange resins from core/shell copolymer having a highly crosslinked core.

9 Claims, No Drawings

SHELL FUNCTIONALIZED ION EXCHANGE RESINS

The present invention relates to a method for the production of improved shell functionalized ion exchange resins from core/shell copolymer having a highly crosslinked core.

In the production of shell functional ion exchange resins, the reaction must be quenched to stop the reaction short of completion. It is often difficult to stop the reaction (sulfonation, chloromethylation, amination) at the proper degree of conversion. In addition the reaction boundary may not be smooth or too distinct leading to bead cracking and fragmentation.

Core/shell beads are known to be functionalized to produce ion exchange resins in the art. U.S. Pat. No. 5,278,193 discloses one such core/shell functionalized bead. However, in U.S. Pat. No. 5,278,193, the core crosslink level is at 8% divinylbenzene (DVB) in the core/shell beads. This level of DVB or crosslinker would not naturally stop the chloromethylation reaction nor prevent the significant swelling of the core with undesirable reactant or solvents. The residual core chloromethyl groups would not be stable in service but would convert to more stable groups such as hydroxy. This is not desirable as it can affect the utility of the particular resin. Higher crosslink levels would stop the chloromethylation and would absorb much less reactant or solvent. The high crosslinked core would be essentially inert in service.

In the present invention it has been found that a copolymer with a high crosslinked core (the term "high or highly crosslinked" herein meaning ≥10% polyethylenically unsaturated monomer for chloromethylation and ≥16% polyethylenically unsaturated monomer for sulfonation) and lower than highly cross-linked shell will naturally stop the reaction at the core/shell inter-phase. In addition there can be slight gradient of crosslink at the inter-phase to increase resin strength.

The method of the present invention advantageously produces a styrene/divinylbenzene copolymer bead which has a lower crosslinked shell for functionalization and higher crosslinked core that does not functionalize under "normal" reaction conditions. This method naturally produces a particular improved (shell functionalized) ion exchange resin. These particular ion exchange resins have improved performance in particle diffusion controlled application: such as chromatography, catalyst, ultra pure water (rinse down), etc.

In the present invention there is provided a method for the production of improved shell functionalized ion exchange resins comprising:
(a) preparing a second stage type free radical matrix;
(b) contacting the second stage type free radical matrix with a monomer feed comprising at least one monomer under conditions such that the second stage type free radical matrix catalyzes a polymerization of the monomer to form copolymer beads having a core/shell morphology; and core/shell copolymer beads formed by the method are provided.

Additionally, the present invention provides a method for the production of improved shell functionalized ion exchange resins comprising:
(a) preparing a single stage type free radical matrix;
(b) contacting the single stage type free radical matrix with a monomer feed comprising at to least one monomer under conditions such that the single stage type free radical matrix catalyzes a polymerization of the monomer to form copolymer beads having a core/shell morphology.

In the present invention, core/shell copolymer beads are functionalized to form strong acid, weak acid, strong base, weak base or chelating type ion exchange resins. For the purposes of this invention, the term ion exchange resin includes chelating resins as well as strong and weak base anion and strong and weak acid cation exchange resins. Representative anionic, cationic or chelating groups are described hereinafter. The resins retain other desired characteristics of gel-type resins, i.e., high capacity and good ion selectivity.

The term "core/shell morphology" or "core/shell" as employed herein, means that the polymeric structure of the copolymer beads of this invention changes from the inside to the outside of the bead. The changes in polymeric structure may be somewhat gradual from the inside to the outside of the bead, yielding a bead having a gradient of polymeric structure along any radius thereof. Preferably, the changes in polymeric structure may be relatively abrupt as one moves along a radius of the bead outward from the center, yielding a bead having a relatively distinct core having one polymeric structure and a relatively distinct shell having another polymeric structure. Accordingly, as used herein, the terms "core" and "shell" refer to the polymeric structure of the inside and the outside of the bead, respectively, and the use of the terms should not be construed as meaning that the beads of this invention will exhibit a distinct interface between the polymers of the inside and the outside of the bead.

It is understood that in describing "core polymers" and "shell polymers" there is usually, if not always a significant amount of interpenetration of the polymers residing in the core and shell of the copolymer beads. Thus, the "core polymers" will extend somewhat into the shell of the bead, and vice versa. The terms "core polymers" and "shell polymers" and like terminology are employed herein to describe the polymeric material in the named portion of the bead in a general way without attempting to identify any particular polymers as "shell" or "core" polymers.

The aforementioned core/shell morphology of the copolymer beads of this invention is detectable using various known techniques for determining the structure of polymeric materials. In general, one or more of the following analytical techniques, among others, can be suitably employed to determine the core/shell morphology of the copolymer beads of the invention: nuclear magnetic resonance NMR (P. J. O'Connor, S. S. Cutie, P. B. Smith, S. J. Martin, R. L. Sammler, W. I. Harris, M. J. Marks, and L. Wilson, "$^1$H NMR Characterization of Swelling in Cross-Linked Polymer Systems", Macromolecules Volume 29, Number 24, Pages 7872-7884, 1996; Kenji Ogino and Hisa.ya Sato, "NMR Analysis of Interaction Between Styrene-Divinylbenzene Gel Beads and Small Molecules", Journal of Polymer Science, Vol. 33, 189-195, 1995.) or analysis of the swelling caharacteristics versus time (EP0098130). In addition, the beads of this invention often exhibit symmetrical strain patterns which are detectable by examination of the beads under polarized light. In some cases, the core/shell morphology of the copolymer beads of this invention is discernible simply from a visual inspection of the beads at no or low magnification, wherein the core is seen as an area of different color or as a darker or lighter area than the shell.

The copolymer beads of this invention can be prepared in any suitable size but advantageously have an average particle diameter in the range from 50 to 7000 microns and preferably from 200 to 2000 microns. The beads are of the so-called "gel" or "microporous" type. Polymerization modifiers such as chain transfer agents or free radical inhibitors can be advantageously employed during the polymerization. As an example the inhibitors contained in stabilized monomers, such as tertbutylcatechol, are advantageously employed in the monomer feed to prevent polymerization and a second generation of particles. All range limits as used herein are inclusive and combinable.

The copolymer beads of this invention are advantageously prepared by forming a crosslinked free radical-containing matrix (hereinafter "free radical matrix"), and contacting the free radical matrix with a monomer feed comprising at least one monomer under conditions such that free radicals catalyze the polymerization of the monomer to form copolymer beads having a core/shell morphology. The polymerization is carried out as a suspension polymerization wherein the polymeric matrix and the monomers to be polymerized are suspended in a suitable suspending medium which is generally an aqueous solution containing a suspension stabilizer. The free radical matrix may be in situ type, single stage type, or second stage type as described herein below.

The preparation of the free radical matrix can be accomplished by any convenient procedure known to those of ordinary skill in the art. For example, the free radical matrix is formed by forming a suspension of particles of a crosslinked or non-crosslinked polymer in a continuous aqueous phase.

The "in situ" type free radical matrix is advantageously prepared by the suspension polymerization of a monoethylenically unsaturated monomer and a polyethylenically unsaturated monomer to form a crosslinked matrix. The amount of polyethylenically unsaturated monomer employed is chosen such that the seed particle is sufficiently crosslinked to render it insoluble in the monomer feed but less than an amount which renders to the seed unable to imbibe the monomers of the monomer feed. Generally, the seed particle is prepared using from 10 to 80, preferably from 12 to 80, preferably from 14 to 80, preferably from 16 to 80, further preferably from 18 to 80 weight percent of cros slinking monomer. As used herein, "crosslinking monomer" means one or more polyethylenically unsaturated monomer(s). All range limits as used herein are inclusive and combinable.

The polymerization is carried out using free radical initiators under conditions such that a plurality of crosslinked polymer particles is prepared. The polymerization is continued until the conversion of the monomers to polymer is at least 20, preferably at least 50, preferably at least 70, further preferably about 50 to ≥95 percent. According to this process, crosslinked polymer particles are prepared which may contain unreacted monomer and do contain a plurality of free radicals. All range limits as used herein are inclusive and combinable.

The "single stage" type free radical matrix is advantageously prepared by suspending a plurality of seed particles in a continuous phase and swelling the seed particles with a free radical initiator.

In the preparation of the "single stage" type free radical matrix, a suspension is formed comprising suspending polymeric seed particles in a continuous phase. The seed particles advantageously comprise a crosslinked addition polymer but may be a crosslinked condensation polymer such as phenol/formaldehyde polymer. The seed particles are crosslinked in an amount which renders them insoluble in the type and amount of monomers employed in later stages of the process but less than an amount which renders them unable to imbibe free radical initiators and monomers. In general, the seed particles are prepared using from 10 to 20, preferably from 12 to 20, more preferably 14 to 20, or still more preferably 16 to 20 weight percent of a crosslinking monomer. Into the suspension containing the crosslinked seed particles is added a free radical initiator which is essentially insoluble in the continuous phase and which is imbibed by the seed particle. When the free radical matrix is formed in this manner, the seed particle which has imbibed the free radical initiator comprises the free radical matrix as that term is employed in this invention.

Additionally, a "second stage" type free radical matrix may be employed which is advantageously prepared by suspending a plurality of polymeric seed particles in an appropriate suspending medium, imbibing into the particles a free radical-containing initial monomer charge and polymerizing the monomers in the initial monomer charge until the conversion thereof into polymer is at least 20 to 95 percent, preferably at least 40 percent, preferably at least 60, preferably at least 70. This second stage free radical matrix will then comprise two polymeric networks. In this process, the seed is advantageously an addition polymer but may be a condensation polymer such as a phenol/formaldehyde polymer. The seed polymer may be crosslinked or noncrosslinked, provided that the seed particle is insoluble in the type and amount of monomers employed in the initial monomer charge.

The initial monomer charge employed in the preparation of the "second stage" type free radical matrix contains both mono- and polyethylenically unsaturated monomers which, when polymerized, form a crosslinked polymer. The amount of crosslinking monomer employed herein is generally sufficient to hinder the reaction of the bead to functionalization such as sulfonation, halomethylation, or amination. In general, the initial monomer charge will comprise at least 10, preferably at least 12, preferably at least 14 weight percent crosslinking monomer to hinder halomethylation and at least 16, preferably at least 18, preferably at least 20 weight percent cros slinking monomer to hinder sulfonation. In addition, the initial monomer charge will advantageously comprise from 0.005 to 2 weight percent of a free radical initiator.

To reduce the formation amount of offsize particles or "fines," the relative proportions of seed particles and initial monomer charge are chosen such that at least 75 weight percent, preferably essentially all of the initial monomer charge is imbibed into the seed particles. The proportions will, of course, vary with the size of the seed particle and the degree of crosslinking in the seed particle. For example, a seed particle of relatively small size will generally imbibe proportionately less monomer than larger particles of similar crosslink density. Similarly, high crosslink density in the seed particle limits the particles' ability to imbibe monomers. In general, the seed particles will generally imbibe from 0.3 to 19, preferably from 0.5 to 5 times their weight of the initial monomer charge. The free radical matrix advantageously comprises from 5 to 90, preferably from 10 to 70, further preferably from 25 to 50, weight percent of the weight of the product copolymer bead.

The prepared free radical matrix is suspended in an appropriate suspending medium. When single stage or second stage free radical matrices are employed, preparation of the matrices and the subsequent addition and polymerization of the monomer feed are advantageously, and preferably, carried out in a single reaction vessel. In general, the suspending medium is a liquid in which both the free radical matrix and the monomers to be contacted therewith are insoluble. The suspending medium is typically an aqueous solution containing from 0.1 to 1.5 weight percent of a suspension stabilizer, but for the polymerization of water-soluble monomers, may be an organic compound. Suitable suspension stabilizers include gelatin, polyvinyl alcohol, sodium polymethacrylate, carboxymethylmethylcellulose, as well as surfactants such as sodium lauryl sulfate, sulfonated polystyrenes and the like. In addition, the suspension may suitably contain polymerization inhibitors, dispersants, and other materials known to be advantageously employed in the suspension polymerization of ethylenically unsaturated monomers.

The suspension is then contacted with a monomer feed comprising at least one ethylenically unsaturated monomer under conditions such that the free radicals contained in the free radical matrix catalyze the polymerization of the monomer feed. Copolymer beads prepared according to this process usually exhibit a core/shell morphology. Generally, the free radical matrix will reside mainly in the core of the polymer beads prepared by this process, while the polymers formed from the monomer feed will generally reside in the shell of the copolymer bead. However, it is believed that interpenetration occurs between the polymers of the free radical matrix and those derived from the monomer feed. Accordingly, the interface between the core and shell may be gradual rather than sharp.

Advantageously, the suspension is heated to a temperature sufficient to initiate the free radical polymerization of ethylenically unsaturated monomers. To the heated suspension is then added a monomer feed under conditions such that essentially all polymerization of the monomers is initiated by the free radicals contained in the polymer matrix. Preferably, the ratio of the weight of polymer to the combined weight of polymer and monomer present at any time during the addition of the monomer feed (instantaneous conversion) is at least 20, further preferably at least 50 percent.

In order to ensure that the polymerization of the monomers in the monomer feed is essentially completely catalyzed by the free radicals contained in the polymeric matrix, the monomer feed advantageously contains essentially no initiators. In addition, the continuous phase is also essentially free of initiators. One or more free radical inhibitors which are soluble in the continuous phase are advantageously employed to inhibit the formation of free radicals in the continuous phase.

After all the monomer feed is added to the reaction mixture, the reaction mixture is maintained at the polymerization temperature until the polymerization reaction is essentially complete. Advantageously, the polymerization temperature is increased, typically in an amount from 20°-30° C. during the final stages of the polymerization reaction to "finish off" the reaction. The resulting polymer beads are recovered via conventional means such as filtration and advantageously dewatered and dried.

The monomers employed in the preparation of the free radical matrix (i.e., those employed in the formation of the seed particle and initial monomer charge, if any) and the monomer feed are advantageously suspension polymerizable ethylenically unsaturated monomers. Such suspension polymerizable monomers are well known in the art and reference is made to Polymer Processes, edited by Calvin E. Schildknecht, published in 1956 by Interscience Publishers, Inc., New York, Chapter III, "Polymerization in Suspension" by E. Trommsdoff and C. E. Schildknecht, pp. 69-109 for purposes of illustration. In Table II on pp. 78-81 of Schildknecht are listed diverse kinds of monomers which can be employed in the practice of this invention. Of such suspension polymerizable monomers, of particular interest herein are the water-insoluble monomers including the monovinylidene aromatic such as styrene, vinyl naphthalene, alkyl substituted styrenes (particularly monoalkyl substituted styrenes such as vinyltoluene and ethyl vinylbenzene) and halo-substituted styrenes such as bromo- or chlorostyrene, the polyvinylidene aromatic such as divinylbenzene, divinyltoluene, divinyl xylene, divinyl naphthalene, trivinylbenzene, divinyl diphenyl ether, divinyl diphenyl sulfone and the like; esters of .alpha.,.beta.-ethylenically unsaturated carboxylic acids, particularly acrylic or methacrylic acid, such as methyl methacrylate, ethyl acrylate, diverse alkylene diacrylates and alkylene dimethacrylates, and mixtures of one or more of the monomers. Of the monomers, the monovinylidene aromatics, particularly styrene or a mixture of styrene with a monoalkyl substituted styrene; the polyvinylidene aromatics, particularly divinylbenzene; esters of .alpha.,.beta.-ethylenically unsaturated carboxylic acids, particularly methyl methacrylate or mixtures containing methylmethacrylate, particularly a mixture of styrene and divinylbenzene or styrene, divinylbenzene and methyl methacrylate are preferably employed herein.

Also included within the polymerizable monomers useful herein are those monomers which form a solution with a liquid, generally water, wherein the resulting solution is sufficiently insoluble in one or more other liquids, generally a water-immiscible oil or the like, such that the monomer solution forms droplets upon its dispersion in the other liquid. Representative of such monomers are water-soluble monomers which can be polymerized using conventional water-in-oil suspension (i.e., inverse suspension) polymerization techniques such as described by U.S. Pat. No. 2,982,749 including ethylenically unsaturated carboxamides such as acrylamide, methacrylamide; aminoalkyl esters of unsaturated carboxylic acids and anhydrides; ethylenically unsaturated carboxylic acids, e.g., acrylic or methacrylic acid, and the like. Preferred of such monomers for use herein are the ethylenically unsaturated carboxamides, particularly acrylamide, and the ethylenically unsaturated carboxylic acids, particularly acrylic or methacrylic acid.

In addition to the aforementioned ethylenically unsaturated monomers, the seed particles employed in the preparation of the single stage and second stage free radical matrices can also comprise a crosslinked condensation polymer such as phenol/formaldehyde resin. In general, the condensation polymers must be able to imbibe the free radical initiators and the monomers of the initial monomer charge, if any, and the monomer feed.

The monomer feed may contain different monomers than those used to prepare the free radical matrix. For example, the monomer feed may comprise styrene, divinylbenzene and methylmethacrylate and the free radical matrix may comprise primarily styrene/divinylbenzene copolymers. When the free radical matrix is prepared by imbibing a catalyst containing initial monomer charge into a seed particle, the seed particle may contain different monomers than the initial monomer charge. Similarly, the composition of the polymers of the polymeric shell may be varied from the inside to the outside of the shell by changing the composition of the monomer feed during the course of the polymerization thereof. Because the polymers contained in the polymer beads of this invention can be widely varied, the beads of this invention can be readily tailored for specific end-uses.

When the monomer feed is a monomer that is functional or can be easily converted to functional groups such as for example ion exchange groups, the crosslinking density of the core monomers maybe lower. Suitable crosslinking density would be 0 to 30%, preferably 0.1 to 20% and most preferably 1 to 10% by weight. For particular weak acid resin the feed monomer could be, for example, divinylbezene with acrylonitrile, or esters of acrylic acid or methacrylic acid. Suitable free radical matrix may comprise styrene/divinylbenzene polymers. Hydrolysis and base or acid reactions, would convert the shell monomers to weak acid groups but have no effect on free radical matrix polymers. For particular anion exchange resin or chelation resin the feed monomer could be divinylbenzene and vinylbenzylchloride while the free radical matrix may comprise styrene/divinylbenzene polymer.

Reaction with amines or chelation groups would convert the shell polymer to functional resins but have no effect on core polymers.

Copolymer beads having relatively uniform size are prepared according to the process of this invention by using uniform size seed particles. Uniform size seed particles are prepared by screening the seed particles or by preparing the seed particles using a process which produces polymer particles of uniform size, such as those taught in published European Patent Application Nos. 0005619 and 0051210. Advantageously, at least 80 percent of the seed particles employed to prepare the copolymer beads of this invention are greater than 0.5 and no more than 1.5 times the weight average particle size of the seed particles.

The size of the copolymer beads of this invention is advantageously in the range from 50 to 2000 microns (μm), preferably from 200 to 1200 μm. Control of the size of the beads is achieved primarily by controlling the size and crosslinking in the seed particles employed, if any, and the amount of monomers employed in the monomer feed. The seed particles can range in size from very small particles, i.e. about 10 μm, to larger particles having a diameter of 750 μm or more. Preferably the size of the seed particle is in the range from about 100 to 750 μm in diameter.

Generally, shell functional ion exchange beads are prepared from the haloalkylated bead by contacting or attaching to the bead a compound reactive with the halogen of the haloalkyl group and which, upon reaction, forms an active ion exchange group. Such compounds and methods for preparing ion exchange resins therefrom, i.e., weak base resins and strong base resins, are well known in the art as in, for example, U.S. Pat. Nos. 2,632,000; 2,616,877; 2,642,417; 2,632,001; 2,992,544 and F. Helfferich. Typically, a weak base resin is prepared by contacting the haloalkylated copolymer with ammonia, a primary amine or a secondary amine. Representative primary and secondary amines include the methyl amine, ethyl amine, butyl amine, cyclohexyl amine, dimethyl amine, diethyl amine and the like. Strong base ion exchange resins are prepared using tertiary amines such as trimethyl amine, triethyl amine, tributyl amine, dimethylisopropanol amine, ethylmethylpropyl amine or the like as aminating agents.

Amination generally comprises heating with reflux a mixture of the haloalkylated copolymer beads and at least a stoichiometric amount of the aminating agent, i.e., ammonia or the amine, to a temperature sufficient to react the aminating agent with the halogen atom attached to the carbon atom .alpha. to the aromatic nucleus of the polymer. A slurry agent such as water, ethanol, methanol, or mixtures of thereof is advantageously employed. Less preferably swelling agents such as methylene chloride, ethylene dichloride, dimethoxymethylene or combinations thereof are optionally, but advantageously employed. Conventionally, amination is carried out at conditions such that anion exchange sites dispersed throughout the shell of the bead. Such amination is generally obtained within 2 to 24 hours at reaction temperatures between 25° and 150° C.

Methods for converting copolymer beads other than poly (vinylaromatic) beads to anion exchange resins are illustrated in Helfferich, supra, pp. 48-58. In addition, methods for attaching other types of anion exchange groups, such as phosphonium groups, to copolymer beads are described therein.

Generally, shell functional chelating resin beads are prepared from the haloalkylated polymer by attaching thereto the chelate active groups, e.g. carboxyl groups. Illustrative of the well-known methods of preparing chelate resins is U.S. Pat. No. 2,888,441 wherein the haloalkylated polymer is aminated by techniques hereinbefore described and the aminated copolymer subsequently reacted with suitable carboxyl containing compound such as chloroacetic acid. Preferably, the haloalkylated polymer can be directly reacted with (1) a suitable amino acid, such as diamino acetic acid or glycine, or (2) an amino pyridine such as 2-picolylamine and N-methyl-2-picolylamine to form a chelate resin.

Shell functional cation exchange resin beads can be prepared using techniques well known in the art for converting the crosslinked addition copolymer of mono- and polyethylenically unsaturated monomers to a cation exchange resin. Illustrative of such methods of preparing cation exchange resin are U.S. Pat. Nos. 3,266,007; 2,500,149; 2,631,127; 2,664,801; 2,764,564 and F. Helfferich, supra. In general, the cation exchange resins useful herein are strong acid resins which are prepared by sulfonating the copolymer beads. Preferably the sulfonation is conducted neat. The bead may be swollen using a suitable swelling agent and the swollen bead reacted with the sulfonating agent. Suitable sulfonating agents are sulfuric acid or chlorosulfonic acid or sulfur trioxide. Preferably, an excess amount of the sulfonating agent, for example, from 2 to 7 times the weight of the copolymer bead, is employed. The sulfonation is conducted at a temperature from 0° to 150° C.

I claim:

1. A method for the production improved shell functionalized ion exchange resins comprising:
   (a) preparing a second stage type tree radical matrix;
   (b) contacting the second stage type free radical matrix with a monomer feed comprising at least one monomer under conditions such that the second stage type free radical matrix catalyzes a polymerization of the at least one monomer to form copolymer beads having a core/shell morphology, and
   (c) functionalizing the copolymer bead by halomethylation or sulfonation; wherein the second stage type free radical matrix is prepared by a process comprising
   (i) suspending a plurality of seed particles in a suspending medium,
   (ii) imbibing into the seed particles a free radical-containing initial monomer charge, and
   (iii) polymerizing monomers in the initial monomer charge until the conversion thereof into polymer is 20 to 95 percent,
   with the proviso that, when the functionalizing the copolymer bead comprises halomethylation, the initial monomer charge comprises at least 14 weight percent crossinking monomer and the monomer feed (b) comprises less than 10 weight percent crosslinking monomer; and
   with the proviso that, when the functionalizing the copolymer bead comprises sulfonation, the initial monomer charge comprises at lease 16 weight percent crosslinking monomer and the monomer feed (b) comprises less than 16 weight percent crosslinking monomer.

2. The method of claim 1 wherein the ploymerization is a suspension polymerization.

3. The method of claim 2 wherein the second stage type free radical matrix and the monomers to be polymerized are suspended in an aqueous solution wherein the aqueous solution comprising a suspension stabilizer.

4. The method of claim 1 further comprises attaching active ion exchange groups to the copolymer beads to form a shell functional ion exchange resin.

5. The method of claim 1 further comprising attaching chelate active groups to the copolymer beads to form shell functional chelating resins.

6. The method of claim 1 wherein the monomer feed further comprises a monomer that is functional or can be easily converted to functional groups.

7. The method of claim 1 wherein the feed monomer comprises divinylbezene and acrylonitrile, or comprises esters of acrylic or methacrylic acid.

8. The method of claim 1 wherein the feed monomer consists of divinylbenzene and vinylbenzyl chloride.

9. Core/shell copolymer beads prepared according to the process of claim 1.

* * * * *